United States Patent [19]

Ogura

[11] Patent Number: 4,941,014
[45] Date of Patent: Jul. 10, 1990

[54] IMAGE FORMING APPARATUS

[75] Inventor: Mitsuru Ogura, Nara, Japan

[73] Assignee: Sharp Kabushiki Kaisha, Osaka, Japan

[21] Appl. No.: 252,685

[22] Filed: Oct. 3, 1988

[30] Foreign Application Priority Data

Oct. 23, 1987 [JP] Japan .................................. 62-268795

[51] Int. Cl.⁵ ...................... G03B 27/32; G03B 27/52
[52] U.S. Cl. ......................................... 355/27; 271/261
[58] Field of Search ............... 271/227, 258, 259, 261, 271/263; 355/30, 50, 76, 308, 206

[56] References Cited

U.S. PATENT DOCUMENTS

| 4,399,209 | 8/1983 | Sanders et al. | 430/138 |
| 4,400,085 | 8/1983 | Nezu | 271/261 X |
| 4,624,560 | 11/1986 | Beery | 355/27 |
| 4,807,868 | 2/1989 | Hirst et al. | 271/263 X |

Primary Examiner—Richard A. Wintercorn
Attorney, Agent, or Firm—Flehr, Hohbach, Test, Albritton & Herbert

[57] ABSTRACT

An image forming apparatus passes a photosensitive sheet between a pair of pressure rollers which are normally pressed against each other. A pressure relieving mechanism is provided so as to release the pressure between these rollers if it is detected that the photosensitive sheet is not being properly transported to the pressure rollers such that the operator can remove the cause of the abnormal condition.

4 Claims, 5 Drawing Sheets

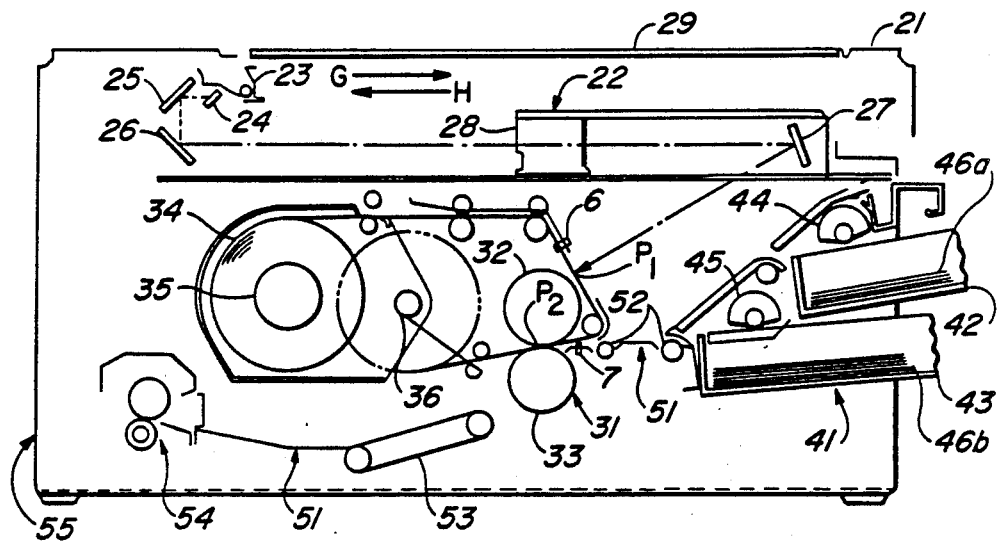
FIG._1.
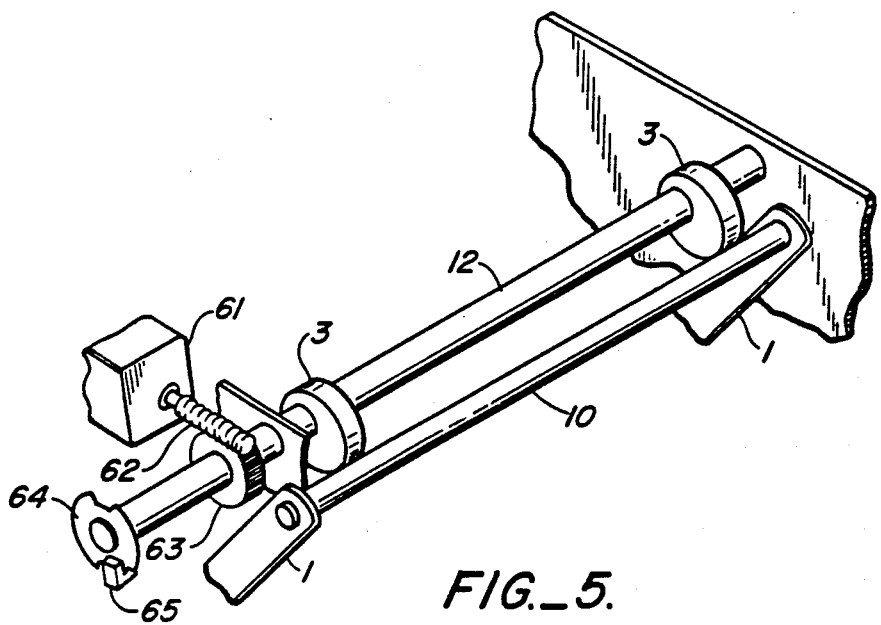
FIG._5.

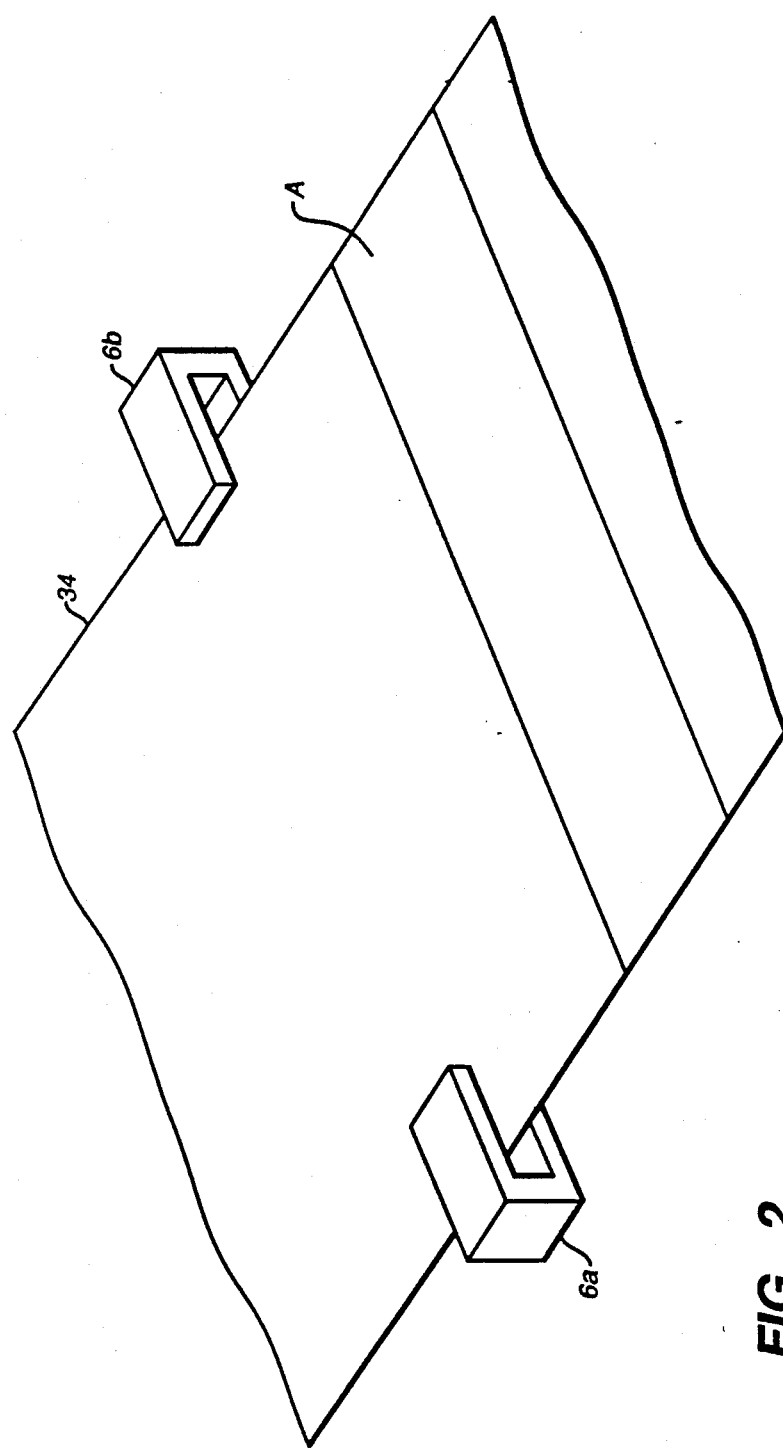
FIG._2

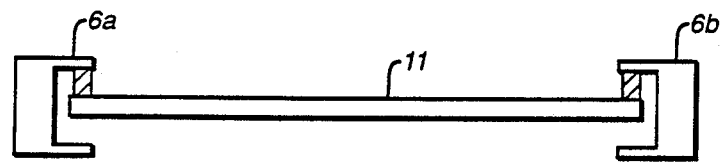
FIG._3A
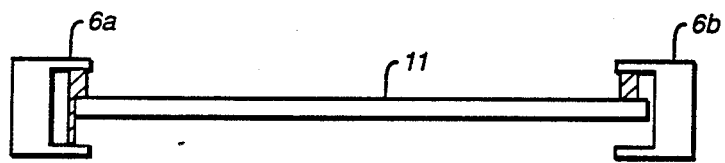
FIG._3B
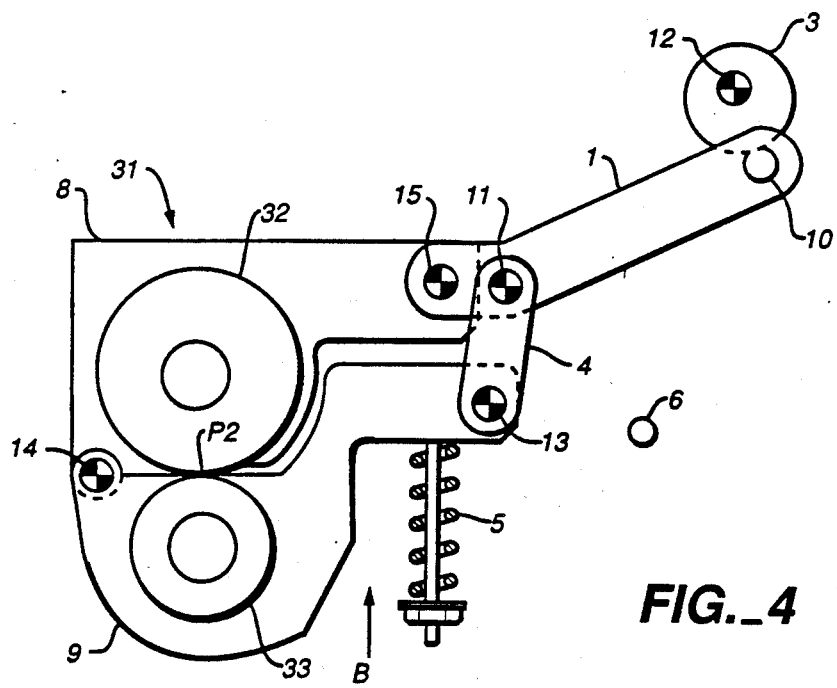
FIG._4

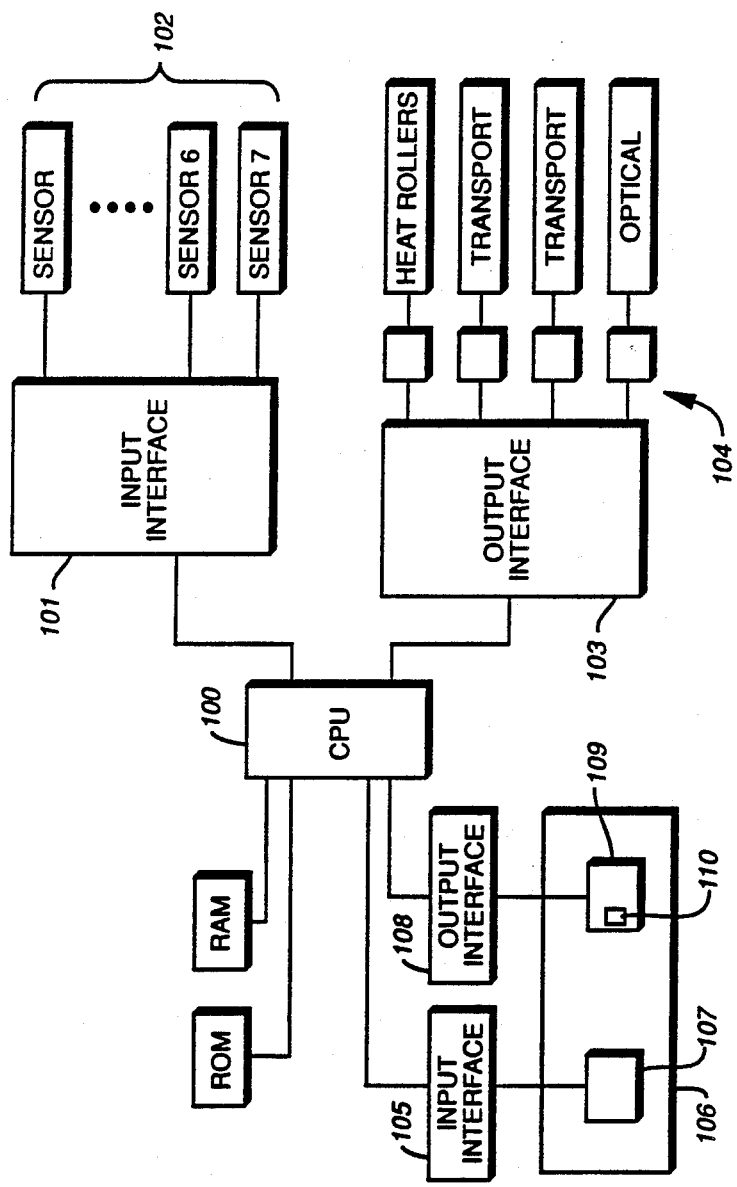
FIG._6

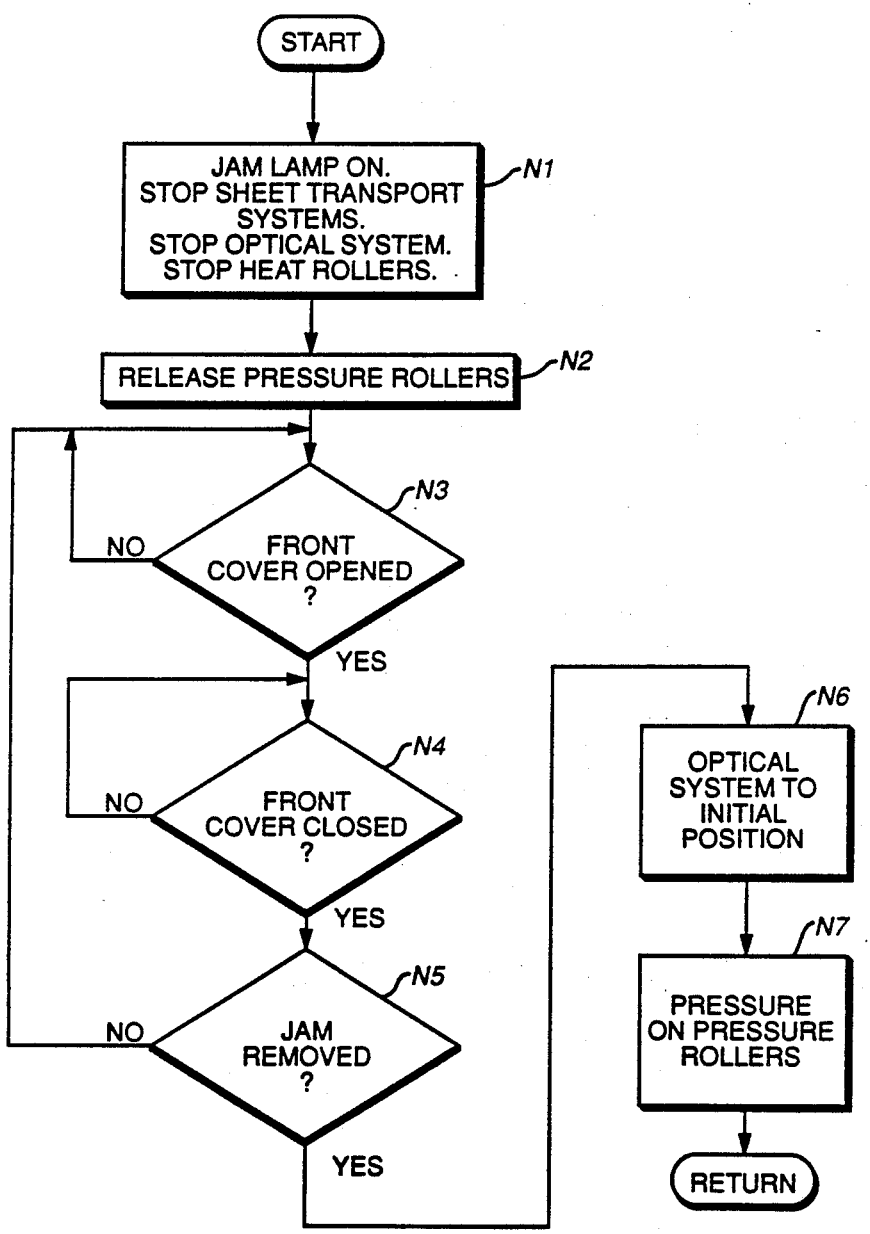
FIG._7

IMAGE FORMING APPARATUS

BACKGROUND OF THE INVENTION

This invention relates to an image forming apparatus of a kind having a photosensitive sheet transported between a pair of pressure rollers and more particularly to such an apparatus which uses as photosensitive sheet a light receiving sheet coated with microcapsules encapsulating a colorless dye and a radiation curable agent and superposes thereon an image receiving sheet coated with a developing agent to pass them together between the pair of pressure rollers.

A method of forming an image by using such a light receiving sheet as photosensitive sheet has been disclosed, for example, in Japanese Patent Publication Tokkai 58-88739. The light receiving sheet is formed by coating a base sheet with microcapsules which encapsulate a colorless dye and a radiation curable material such as a photopolymerizing monomer such as a selectively hardened image can be formed thereon by exposure to an image carrying beam of light. If an image forming sheet coated with a developing agent is superposed on such a light receiving sheet with a selectively hardened pattern formed thereon and pressed together therewith between a pair of pressure rollers, a visible image can be chromogenically formed on the image receiving sheet.

To explain the above more in detail, a selectively hardened pattern is formed on the light receiving sheet by exposure to an image carrying beam of light reflected from an original document to be copied because only those of the microcapsules exposed to light energy are hardened. When an image receiving sheet is superposed on such a selectively hardened pattern and compressed together, those of the microcapsules which have not been hardened by exposure to light rupture and thereby cause the encapsulated dye to flow out and to chromogenically react with the developing agent on the image receiving sheet.

Pressure rollers which are used for such a purpose must be able to apply a fair large pressure on the sheets which are passed therebetween. The required linear pressure may be about 90 kg/cm. Because such a large pressure must be applied on the sheets that pass between the rollers, however, the sheets tend to wrinkle and/or travel on a zigzag path. This also tends to cause a jam near the pressure rollers.

SUMMARY OF THE INVENTION

It is therefore an object of the present invention in view of the above to provide an image forming apparatus which can prevent a jam and wrinkling of the light receiving sheet near its pressure rollers.

It is another object of the present invention to provide an image forming apparatus which can automatically detect an abnormal condition in the transportation of the light receiving sheet and release the pressure between the pressure rollers.

An image forming apparatus embodying the present invention with which the above and other objects can be achieved is characterized as comprising not only a pair of pressure rollers but also detecting means for detecting an abnormal transportation condition of the light receiving sheet being transported between these rollers and releasing means for releasing the pressure between the pressure rollers when an abnormal transportation condition is detected by the detecting means.

If an abnormal transportation condition is detected by the detecting means of an image forming apparatus thus structured, the pressure with which the pressure rollers are compressed to each other is released such that the operator can determine the cause of the abnormality and correct the condition of operation.

BRIEF DESCRIPTION OF THE DRAWINGS

The accompanying drawings, which are incorporated in an form a part of the specification, illustrate an embodiment of the present invention and, together with the description, serve to explain the principles of the invention. In the drawings:

FIG. 1 is a schematic frontal sectional view of an image forming apparatus embodying the present invention, FIG. 2 is a diagonal view of a portion of the apparatus of FIG. 1 around one of its photosensors above its exposure point, FIGS. 3A and 3B are schematic drawings showing a light receiving sheet being transported normally past the photosensor and with a zig-zag motion which is being detected by the photosensor, respectively, FIG. 4 is a front view of a pressure applying mechanism of the apparatus of FIG. 1, FIG. 5 is a diagonal view of a portion of the pressure applying mechanism shown in FIG. 4, FIG. 6 is a schematic block diagram of the control unit for the image forming apparatus shown in FIG. 1, and FIG. 7 is a flow chart of the operation of the apparatus when an abnormal condition of the light receiving sheet has been detected.

DETAILED DESCRIPTION OF THE INVENTION

As shown in FIG. 1, an image forming apparatus embodying the present invention, adapted to use as photosensitive sheet a light receiving sheet of the aforementioned kind has a document table 29 made of a hard transparent glass material on top of its main housing structure 21. Below the document table 29 is an optical system 22 comprised of a light source 23, mirrors 24-27 and a lens 28. Of the components of this optical system 22, the light source 23 and the mirrors 24-26 are adapted to move below the document table 29 in the directions of arrows G and H for scanning an original document to be copied which is placed on the document table 29.

Inside the main housing structure 21 and nearly at the center thereof are an upper pressure roller 32 and a lower pressure roller 33 disposed one above the other such that their peripheral surfaces are in oontact with each other. These rollers 32 and 33 together form a pair and may be referred to as the compression section 31 of the apparatus. Disposed to the left of the upper pressure roller 32 are a supply shaft 35 and a take-up shaft 36. The supply shaft 35 carries around its external circumference a roll of light receiving sheet 34 coated with microcapsules encapsulating therein a colorless dye and a radiation curable material such as a photopolymerizing monomer. A front portion of a certain length of this light receiving sheet is made of a relatively stiff material and not coated with microcapsules. This front portion is referred to as a leader section of the rolled light receiving sheet. The light receiving sheet 34 is passed around a number of guide rollers as well as between the upper and lower pressure rollers 32 and 33 and wound up around the external peripheral surface of the take-up shaft 36.

Attached to the right-hand side of the main housing structure 21 are paper cassettes 42 and 43 which, together with paper feed rollers 44 and 45, form what may be referred to as the paper supply section 41. These paper cassettes 42 and 43 serve to store image receiving sheets 46a and 46b coated with a developing agent which is further coated with a colorless thermoplastic resin material. The image receiving sheets 46a and 46b are delivered one sheet at a time by the rotation of the paper feed rollers 44 and 45. A paper transportation path 51 is formed from the paper supply section 41 through the compression section 31 to a paper discharge section 55 on the left-hand side of the main housing structure 21. The transportation path 51 is further provided with transportation rollers 52, a conveyer belt 53 and heat rollers 54.

In FIG. 1, $P_1$ indicates an exposure point where the light receiving sheet is exposed to light transmitted from and focused by the optical system 22 and $P_2$ indicates a pressure point at which the upper and lower pressure rollers 32 and 33 contact each other to apply a pressure on the light receiving sheet and the image receiving sheet. Photosensors 7 and 6 are disposed immediately before the pressure rollers 32 and 33 along the path for the light receiving sheet 34 and immediately before the exposure point $P_1$, respectively, for detecting a zig-zag motion of the light receiving sheet 34 as will be explained more fully below.

During an image forming process of apparatus thus structured, an image receiving sheet 46a or 46b is supplied to the compression section 31 and the light source 23 and mirrors 24–26 of the optical system 22 move at the same time in the direction of the arrow G below the document table 29. Light from the source 23 is made incident upon the original document to be copied and the reflected beam of light is propagated along the path indicated by broken lines, passing through the lens 28 and directed by the mirror 27 onto the surface of the light receiving sheet 34 at the exposure point $P_1$. As the paper feed roller 44 or 45 is rotated and the optical system 22 is moved as mentioned above, the supply shaft 35, the take-up shaft 36, and the upper and lower pressure rollers 32 and 33 are also rotated such that the light receiving sheet 34 is supplied from the supply shaft 35, passed between the pressure rollers 32 and 33 together with the image receiving sheet and wound up around the take-up shaft 36 at a predetermined speed.

By the exposure to the reflected light from the document on the document table 29, those of the microcapsultes coating the surface of the light receiving sheet 34 are hardened as explained above and a selectively hardened image is formed on the light receiving sheet 34. When this selectively hardened image is superposed with the image receiving sheet 46a or 46b supplied from one of the cassettes 42 and 43, a visible image is transferred onto the image receiving sheet 46a or 46b by a chromogenic reaction between the developing agent coating its surface and the colorless dye flowing out of those of the microcapsules which were not hardened by the exposure to light at the exposure point $P_1$.

The image receiving sheet, after a visible image is thus formed thereon, is directed by the conveyer belt 53 to the heat rollers 54 by which the surface is made lustrous. This is done because the heat from the heat rollers 54 melts the thermoplastic material which coats the surface of the image receiving sheet as explained above. The image receiving sheet is thereafter discharged through a discharge section 55 to the exterior of the main housing structure 21. In the meantime, the light receiving sheet 34, after passing between the pressure rollers 32 and 33 together with the image receiving sheet, is directed toward and wound around the take-up shaft 36.

If a zig-zag movement of the light receiving sheet 34 is detected by either of the photosensors 6 and 7 while the former is being transported toward the pressure rollers 32 and 33, the pressure between the pressure rollers 32 and 33 at the pressure point $P_2$ is released as will be explained more fully below.

As shown in FIG. 2, the photosensor 6 above the exposure point $P_1$ is comprised of two sensor units 6a and 6b which form a pair and are disposed so as to be able to detect the mutually opposite side edges of the incoming light receiving sheet 34. In FIG. 2, A indicates the portion of the light receiving sheet 34 which is being exposed to light at the exposure point $P_1$. Each of the sensor units 6a and 6b includes a light-emitting element and a light-receiving element so as to be switched off if the light path therebetween is obstructed by the light receiving sheet 34. These photosensor units 6a and 6b are so disposed with respect to the intended normal path of the light receiving sheet 34 above the exposure point $P_1$ that, if the light receiving sheet 34 is not zigzagging but is proceeding toward the exposure point $P_1$ normally, its side edges obstruct the light paths of both units 6a and 6b as shown in FIG. 3A but, if the light receiving sheet 34 deviates sideways from its intended path, its relative positions to the photosensor units 6a and 6b change and one of the units 6a and 6b is switched on. FIG. 3B shows an exemplary situation wherein the light receiving sheet 34 has moved sideways towards one of the units (6b) such that the other unit (6a) has been switched on. In other words, a sideward deviation of the light receiving sheet 34 can be detected from a changed output pattern from the photosensor units 6a and 6b. The other photosensor 7 disposed on the upstream side of the pressure point $P_2$ with respect to the direction of travel of the light receiving sheet 34 is similarly structured and functions similarly to detect a sideward deviation of the light receiving sheet 34 as it approaches the pressure point $P_2$.

A mechanism for keeping the pressure rollers 32 and 33 in a mutually compressing relationship across the pressure point $P_2$ is explained next. As shown in FIG. 4, the upper pressure roller 32 is axially supported by a fixed holder 8 and the lower pressure roller 33 is axially supported by a movable holder 9 which is rotatably connected to the fixed holder 8 around an axis 14. A spring 5 is attached to the movable holder 9 at a point distal from the axis 14 such that a biasing force in the direction of arrow B is constantly applied to the movable holder 9 and hence that the pressure rollers 32 and 33 are normally compressed toward each other at the pressure point $P_2$.

At the other end of the fixed holder 8 for the upper pressure roller 32 distal from the axis 14, a lever 1 is attached rotatably around another axis 15. This lever is also connected to the movable holder 9 for the lower pressure roller 33 through a connecting piece 4 which is axially attached to both the lever 1 and the movable holder 9 around axes 11 and 13, respectively. The axes 11 and 15 around which the lever 1 is connected to the connecting piece 4 and the fixed holder 8 are relatively close to each other as shown in FIG. 4. The axis 13 around which the connecting piece 4 is attached to the movable holder 9 is at the opposite end distal from the axis 14 around which the fixed and movable holders 8 and 9 are engaged together.

As shown more clearly in FIG. 5, a connecting rod 10 is attached to the other end of the lever 1 distal from the axes 11 and 15. This connecting rod is in contact with the peripheral surfaces of cams 3 supported by a cam shaft 12 and this cam shaft 12 is in a motion-communicating relationship with a motor 61 through a worm gear 63 and a worm roller 62. The cam shaft 12 also supports a notched disk 64 such that a photosensor 65 can detect the angular position of the notch on the disk 64 to thereby determine whether the cams 3 are in contact with the connecting rod 10. When the photosensor 65 detects the notch on the disk 64, the cams 3 are in contact with the connecting rod 10 as shown in FIG. 4 and the lever 10 is rotated around the axis 15 in the clockwise direction with reference to FIG. 4. This means that a downward force is applied to the connecting piece 4 such that the movable holder 9 is slightly rotated around the axis 14 in the clockwise direction against the biasing force of the spring 5, thereby releasing the pressure between the pressure rollers 32 and 33 at the pressure point $P_2$.

FIG. 4 shows a point in time when the movable holder 33 has already rotated a small amount in the clockwise direction around the axis 14 from the totally compressed condition such that the compressive force at the pressure point $P_2$ has just been released. If the motor 61 begins to rotate from the situation depicted in FIG. 4, the connecting rod 10 follows the rotation of the cams 3 by the biasing force from the spring 5 such that the lever 1 begins to rotate around the axis 15 in the counter-clockwise direction. At the same time, the movable holder 9 begins to rotate around the axis 14 in the counter-clockwise direction. When the minor axes of the cams 3 come to be in contact with the connecting rod 10, the photosensor 65 detects the notch on the disk 64, thereby stopping the motion of the motor 61. By this time, the pressure rollers 32 and 33 are pressed against each other with a sufficient compressive force across the pressure point $P_2$. In other words, the minor axes of the cams 3 are normally in contact with the connecting rod 10 and the pressure roller 32 and 33 are normally in a mutually compressed condition.

When the output from either of the photosensors 6 and 7 changes, this indicates an abnormal condition illustrated in FIG. 3B and the motor 61 is then activated to rotate the cams 3 until the photosensor 65 comes to detect the notch on the disk 64 corresponding to the major axes of the cams 3. When the major axes of the cams 3 come to be in contact with the connecting rod 10, the motor 61 is stopped. At this moment, the operator is ready to correct the position of the light receiving sheet 34 and when this is done and the front cover (not shown) of the apparatus is closed, the motor 61 is rotated again until the minor axes of the cams 3 come to touch the connecting rod 10. In short, as soon as a zig-zagging motion of the light receiving sheet 34 is detected, the pressure between the upper and lower pressure rollers 32 and 33 is released automatically and as soon as the direction of motion of the light receiving sheet 34 is corrected, the pressure rollers 32 and 33 are automatically brought back to their normal, mutually compressing condition.

With reference next to FIG. 6 which shows the control unit of the image forming apparatus described above, numeral 100 indicates a central processing unit CPU which controls the overall operation of the apparatus. Through an input interface circuit 101, the CPU 100 receives signals from sensors 102 inclusive of the photosensors 6 and 7 and a sensor for detecting the opening and closing of the front cover of the apparatus. Driving commands are outputted from the CPU 100 through an output interface circuit 103 to various driving means 104 for the optical system, the transportation system for the light receiving sheet, the transportation system for the image receiving sheet, the heat rollers, etc. The CPU 100 also receives key input data from input keys 107 on the operating panel 106 (not shown in FIG. 1) through another input interface circuit 105 and outputs display data through another output interface circuit 108 to a display section 109 which includes a jam lamp 110 adapted to be lit when an abnormal condition of the light receiving sheet 34 is detected.

As shown in FIG. 7, the jam lamp 110 is switched on if either of the photosensors 6 and 7 detects an abnormal condition of the light receiving sheet, independently of whether a jam has occurred in the apparatus or not. At the same time, the driving means for the transporting means, the optical system and the heat rollers are all stopped (n1). Next, the motor 61 is operated to release the pressure between the upper and lower pressure rollers 32 and 33 (n2). If the aforementioned detector for the front cover detects that the front cover has been opened (YES in n3) and the closed (YES in n4), the control system checks to determine whether the cause of the trouble has been properly removed by the operator (n5). If the output from the photosensors 6 and 7 is off, the control system assumes that the jam has been removed and, if otherwise, the control system returns to Step n3 and waits for the operator to open the front cover again to rectify the situation. If it is ascertained that the jam has been removed (YES in n5), the optical system is moved to its initial position (n6) and then the motor 61 is activated to bring the pressure rollers 32 and 33 back to their normal, mutually compressing condition (n7).

In summary, as soon as the light receiving sheet begins to move sideways, this zig-zag motion is detected by a photosensor and the pressure between the pressure rollers is automatically released. Thus, it can be easily and reliably prevented to continue making copies from a zig-zagging light receiving sheet. Although the use of photosensors was disclosed in the above embodiment, this is not intended to limit the scope of the invention. Use may equally well be made of mechanical sensors with actuators. It also goes without saying that the present invention is also applicable to the detection of an abnormal traveling condition of an image receiving sheet. In other words, the present invention also teaches an image forming apparatus adapted to automatically release the pressure between the pressure rollers if an abnormal condition is detected in the transportation of an image forming sheet toward the pressure point $P_1$. This is particularly useful if use is made of an image receiving sheet in a rolled form. Any modifications and variations of the embodiment disclosed above which may be apparent to a person skilled in the art are intended to be included within the scope of the present invention.

What is claimed is:

1. An image forming apparatus comprising a pair of pressure rollers which are pressed against each other while a sheet is passed therebetween, detecting means for detecting an abnormal condition in the transportation of a sheet being passed between said pressure rollers, and releasing means for releasing pressure between said pressure rollers when said detecting means detect an abnormal condition.

2. The image forming apparatus of claim 1 further comprising a biasing means for keeping said pressure rollers pressed against each other at least while said sheet is being passed between said pressure rollers.

3. The image forming apparatus of claim 1 wherein said detecting means include a pair of sensors each positioned to detect whether a side edge of said sheet is passing an intended position.

4. The image forming apparatus of claim 3 wherein said sensors are photosensors including a light-emitting element and a light-receiving element.

* * * * *